Patented Oct. 29, 1935

2,018,680

UNITED STATES PATENT OFFICE 2,018,680

HYDROGENATION OF PYRIDINE BODIES

Wilbur A. Lazier, Marshallton, Del., assignor to E. I. du Pont de Nemours & Company, Wilmington, Del., a corporation of Delaware No Drawing. Application February 24, 1934,
Serial No. 712,841. In Canada May 11, 1931

11 Claims. (Cl. 260—43)

This invention relates to catalytic processes and more particularly to a process for the hydrogenation of pyridine bodies by means of certain metallic hydrogenating catalysts.

Considerable work has been done in the field of catalytic chemistry with a view to developing improved catalysts for the hydrogenation of such unsaturated compounds as the olefines, unsaturated fats and fatty acids, benzene and its derivatives, and a large number of other compounds containing unsaturated functions such as the halides, nitriles, amides and heterocyclic unsaturated rings. Most of this work has been based upon the classical discovery of Sabatier that finely divided metallic nickel is capable of causing the union of hydrogen with these compounds. The method has been further expanded and supplemented by the work of Ipatief on the application of high pressures to these reactions.

Extensive research has been carried out heretofore with the result that several different methods for the preparation of hydrogenation catalysts have been developed, the most common of which involve the precipitation and reduction of nickel hydroxide or carbonate, the reduction of nickel oxide prepared by ignition of the nitrate, anodic oxidation followed by reduction, heating certain organic salts of nickel to their decomposition temperature, and electrochemical deposition of metallic nickel.

Furthermore, various methods of reduction have been proposed ranging from the ordinary dry reduction with hydrogen to reduction in an inert liquid vehicle or in the presence of the oil or other substance undergoing hydrogenation. As is well known, these catalysts have found extensive use in the commercial hydrogenation of fats, oils and similar readily hydrogenated substances.

I have found, however, that in general catalysts prepared by the above methods, although ordinarily suitable for the hydrogenation of fats and oils, may be inadequate for the more difficult hydrogenation of such compounds as aldehydes, ketones, sugars, phenols, furfural and its derivatives, or benzene and pyridine and their homologues.

In my co-pending applications Serial Nos. 456,298 and 456,299, filed May 27, 1930, of which the present application is a continuation-in-part, hydrogenating metal catalysts are described which may be employed in these more difficult hydrogenations.

It is an object of the present application to cover more specifically the catalytic hydrogenation set forth in my co-pending applications as related to the catalytic hydrogenation of pyridine bodies in the liquid phase with certain highly efficient catalysts. A more specific object is to provide a highly efficient process for the hydrogenation of pyridine. Other objects will appear hereinafter.

These objects are accomplished by bringing the pyridine body in liquid phase together with hydrogen into contact with a catalyst, preferably substantially alkali-free, comprising essentially nickel, which may be present at least partly in oxidized form, and an oxidized form of a metal forming a metallic oxide which is more acidic in character than nickel oxide. An example of such a catalyst is the reduction product of a reducible nickel compound, one component of which is an oxidized form of at least one metal selected from sub-groups A of the fourth, fifth and sixth groups of the periodic system. Although catalysts of other compositions are disclosed in my co-pending applications, the results with catalysts of the type described have been especially efficacious in the present field.

One method of accomplishing the desired objective is to employ a catalyst prepared by heating a double chromate of a nitrogen base and nickel, such as one of the double ammonium chromates, to its spontaneous decomposition temperature, thereby converting the chromate to a chromite. This conversion constitutes a species of reduction, since the valence of the chromium atom has been changed from a higher to a lower value. This heating or ignition may be accompanied or followed, respectively, by the step of simultaneously or subsequently reducing the resulting chromite with hydrogen. After such treatment the catalyst consists of a finely divided, black refractory powder which should be protected from the air.

While the invention is susceptible to considerable variation and modification in the manner of its practical application, particularly as regards the nature of the pyridine bodies reacted upon, the operating temperatures and pressures, and the methods of preparing the catalysts, the following examples, in which the parts are by weight, will serve to illustrate how the invention may be practiced.

*Example I*

Seventeen hundred fifty (1750) parts of nickel nitrate were dissolved in 3000 parts of water and mixed with a solution of 750 parts of ammonium bichromate in an equal volume of water. The mixed solution was heated to 90° C. to 100° C. for thirty minutes with stirring, after which the brick-red precipitate formed was washed by decantation and dried. By analysis, the dried product contained 6.7% ammonia and 26.6% nickel, and most probably consisted of a complex double chromate of ammonia and nickel. This compound was ignited at 400° C. to drive off the ammonia and part of the oxygen in order to convert the compound to nickel chromite and was then reduced for twelve hours in a stream of dry hydrogen at 500° C.

One hundred seventy-five (175) parts of pyridine were charged into a steel reaction vessel, together with 14 parts of reduced nickel chromite prepared as above described. The contents of the vessel were agitated with an initial hydrogen pressure of 2000 pounds per square inch (about 136 atmospheres) while being heated to a temperature of approximately 190° C. At this temperature hydrogen absorption took place and continued while the temperature was raised to and maintained at 220° C. After approximately two and one-half hours the hydrogen absorption was complete and distillation of the product resulted in the isolation of at least 85% of the theoretical yield of piperidine.

*Example II*

Instead of employing the catalyst of Example I, the process of Example I may be carried out with approximately the same proportions of a catalyst prepared by suspending 228 parts of pure nickel hydroxide in water, treating the suspension with 200 parts of chromic anhydride, filtering the resulting paste, drying and igniting four hours at 600° C., and thereafter reducing the residual nickel chromite composition over a period of twenty-four hours with hydrogen at 450° C. to 500° C.

*Example III*

Another catalyst suitable for carrying out the process of Example I may be prepared by dissolving 290 parts of nickel nitrate in 2000 parts of water, treating with an equal volume of water containing 194 parts of potassium chromate, heating the mixture to 90° C., then treating with a solution containing 56 parts of potassium hydroxide, decanting, washing and drying the precipitate, thereafter heating at a dull red heat for four hours, then cooling and again washing to free the composition from the last of the potassium chromate set free by the ignition, and reducing in hydrogen as outlined in Example II.

*Example IV*

The general procedure of Example I may be followed, except that the catalyst is substituted by an approximately equal amount of a catalyst comprising reduced nickel supported upon and partially combined with chromium oxide prepared by reducing with hydrogen at 400° C. a green double salt of nickel and ammonia having the probable formula $(NH_4)_2Ni(CrO_4)_2.6H_2O$.

*Example V*

A nickel chromite catalyst comprising reduced nickel supported upon and partially combined with chromium oxide was prepared by reducing with hydrogen at 400° C. to 450° C. a double salt of nickel and ammonia which may be more properly characterized as nickel-ammonium chromate. Eight parts of this reduced nickel chromite catalyst were added to 200 parts of a 20% solution of sodium picolinate in water. The salt solution and catalyst were charged into a pressure-resistant vessel and agitated with hydrogen under a pressure of 1200 pounds per square inch (about 82 atmospheres) while being heated to 175° C. Absorption began at a temperature of 175° C. and continued while the temperature was increased to 200° C. Hydrogen absorption was complete in three to four hours and yielded a solution of sodium pipecolinate (the sodium salt of 2-methyl-piperidine carboxylic acid).

The invention is applicable to the hydrogenation of other pyridine bodies than those given in the examples, including: 3-methyl-pyridine, 4-methyl-pyridine, 2-methyl-pyridine, 2:3-dimethyl-pyridine, 2:4-dimethyl-pyridine, 2:5-dimethyl-pyridine, 2:6-dimethyl-pyridine, 3:4-dimethyl-pyridine, 3:5-dimethyl-pyridine, 2-ethyl-pyridine, symmetrical 2:4:6-trimethyl-pyridine, 2:3:4-trimethyl-pyridine, 2:4:5-trimethyl-pyridine, 2-methyl-5-ethyl-pyridine, 2-methyl-6-ethyl-pyridine, 3-methyl-4-ethyl-pyridine, 2-propyl-pyridine, 4-isopropyl-pyridine, tetramethyl-pyridine, vinyl-pyridine and higher alkyl pyridines; also, pyridine-2:3-dicarboxylic acid, pyridine-3:4-dicarboxylic acid, nicotinic acid, alpha-pyridyl-methyl-ketone, alpha-pyridyl-dimethyl-carbinol, beta-pyridyl-carbinol, gamma-benzyl-pyridine, alpha-amino-pyridine, alpha-stearyl-pyridine, beta-amino-pyridine, 2:6-diamino-pyridine, 2:3-diamino-pyridine, 3:5-dibenzyl-pyridine, gamma:gamma-dipyridyl, beta-phenyl-pyridine, 2-benzyl-pyridine, 4-pyridyl-phenyl-ethylene, 2-benzoyl-pyridine, 2-pyridyl-pyrrol, and the like. The invention is also applicable to the treatment of mixtures of pyridines and quinoline, isoquinoline and quinaldine.

The optimum temperatures and pressures may vary with the particular pyridine body treated. In general, the temperature range may vary from about 100° C. to about 300° C., although it is possible that, in some instances, higher or lower temperatures may be used provided suitable pressures are employed. For the hydrogenation of pyridine and homologues thereof temperatures within the range of about 175° C. to 225° C. and pressures of about 75 to 500 atmospheres are preferably employed. Once a pressure has been attained at which hydrogen absorption begins, there appears to be no upper limit as to the amount of pressure which may be used. Pressures of 100, 150, 200, 300 400, 500, and 1000 atmospheres are suitable where apparatus capable of withstanding such pressures is available.

The hydrogenation may be carried out in the presence of diluents or solvents such as water, alcohols (e. g., methyl alcohol, ethyl alcohol, isopropyl alcohol and diethylene glycol), tetrahydronaphthalene (tetralin), decahydronaphthalene, cyclohexane, hexahydrophenol and various amines such as, for example, dibutyl amine. The use of a solvent or diluent is especially desirable when the pyridine body to be hydrogenated has a high melting point.

While it has been indicated above that the catalyst is a composition, preferably substantially alkali-free, comprising essentially a ferrous metal such as nickel and/or nickel oxide together with an oxidized form of a metal forming an oxide more acidic in character than nickel oxide, it will be recognized that the exact constitution of the catalyst may vary, depending upon the method of preparation. Thus, the amount of combined oxygen (i. e., combined with nickel and the other metal or metals present) may vary with the method of reduction. The acidic oxides referred to are oxides of elements such as those contained in sub-group A of the fourth, fifth and sixth groups of the periodic system (for example, chromium, molybdenum, tungsten, vanadium, uranium, and titanium). Among the salts which are especially suitable for the preparation of the hydrogenating catalysts of this invention may be mentioned the chromates and molybdates.

When the nickel catalyst is prepared by (1) the reduction of a chromate with hydrogen, or (2) ignition of a chromate to a chromite followed by a reduction with hydrogen, the nickel chromate is first converted to a chromite composition which may be considered to consist of nickel oxide and nickel chromite in which chromium is in the trivalent form. This composition is then reduced further to a composition consisting of metallic nickel, nickel oxide and nickel chromite. It will be recognized that the hydrogenating metal may exist either in the metallic form or as an oxide or both, depending to a certain extent upon the method of preparation and reduction employed.

The term "chromite" is not intended to define a definite chemical compound but rather a composition in which the catalytically reactive component is the hydrogenating metal and which may be combined or associated with a more acidic oxide in a lower stage of oxidation.

In the preparation of chromite catalysts, nickel chromate may first be prepared by reacting a nickel salt with an alkali metal chromate such as, for example, sodium chromate, or by digesting nickel oxide or carbonate with chromic acid. The resulting chromate is then ignited at a dull red heat and, after cooling, the black residue containing partially combined nickel and chromium oxide may be extracted with hot water to remove any remaining alkali residue. The purified nickel chromite residue is then reduced by heating with hydrogen at temperatures between 400° C. and 500° C. It is to be noted that in the preparation of catalysts as given in Example II, the treatment of solutions of nickel salts with an alkali metal chromate yields a precipitate of basic nickel chromate that always contains alkali metal chromate which can be leached out only after heating at a temperature sufficient to destroy nickel chromate.

Alternatively, one may react concentrated solutions of nickel salt with neutral ammonium chromate with a separation of crystalline double salts of nickel ammonium chromate. According to another procedure, two molar solutions of nickel nitrate and ammonium chromate are mixed in equivalent amounts and heated to boiling, whereupon a brick-red precipitate of double nickel ammonium chromate is separated. Ammonia may be added to neutralize the acid solution formed by the precipitation and greatly improve the yield. The double ammonia chromate is heated slightly to occasion spontaneous decomposition, and the resulting ignited product may be further reduced with hydrogen. Instead of ammonia, I may use any other water-soluble nitrogen base such as, for example, pyridine, aniline and methylamine. The nitrogen base compounds of nickel chromate typified by nickel ammonium chromate are preferably heated slowly to start the reaction, after which they decompose spontaneously leaving a residue of nickel chromite. The spontaneous decomposition temperature will vary for the different compounds but, in general, it may be said to be from 200° C. to 400° C. Reduction of the resulting chromite composition may be carried out at 400° C. to 600° C., preferably at 500° C.

It will be understood throughout the specification and claims that, unless otherwise indicated, any reference to the catalyst composition relates to the composition before use in the hydrogenation process.

The catalysts of this invention have several advantages. Not only is the catalyst very active but is, also, more capable of withstanding catalyst poisons, such as sulfur, than many known types of catalysts. This is presumably because of the potential supply of unreduced nickel (or other catalytic hydrogenating metal) which may be continuously activated under the conditions of hydrogenation. When badly poisoned, the supporting oxide (for example, chromium oxide) facilitates regeneration which may be brought about by gentle ignition, followed by reduction. It will be apparent that a continuous method of hydrogenation employing the catalyst of this invention may be employed by converting the chromite catalyst into a granular form by compression followed by a reduction of the grains to a suitable size. It will be apparent, also, that this method of hydrogenation, which is not possible at all with the usual form of powder catalyst, offers many advantages over the usual autoclave processes.

As many apparently widely different embodiments of this invention may be made without departing from the spirit and scope thereof, it is to be understood that I do not limit myself to the specific embodiments thereof except as defined in the following claims.

I claim:

1. In a process of catalytic hydrogenation, the step which comprises bringing a pyridine body and hydrogen, under super-atmospheric temperature and pressure conditions, into contact with a catalyst comprising essentially nickel which may be present at least partly in oxidized form and an oxidized form of a metal forming a metallic oxide which is more acidic in character than nickel oxide.

2. In a process of catalytic hydrogenation, the step which comprises bringing a pyridine body in liquid phase and hydrogen, under super-atmospheric temperature and pressure conditions, into contact with a catalyst which is a reduction product of a reducible nickel compound, one component of which is an oxidized form of at least one metal selected from sub-groups A of the fourth, fifth and sixth groups of the periodic system.

3. The process according to claim 2, in which the catalyst is a reduction product of a multiple chromate of a nitrogen base and nickel.

4. In a process of catalytic hydrogenation, the step which comprises bringing a pyridine body in liquid phase and hydrogen, under super-atmospheric temperature and pressure conditions, into contact with a catalyst prepared by heating a multiple chromate of a nitrogen base and nickel to its spontaneous decomposition temperature, and thereafter reducing the resultant composition in hydrogen.

5. In a process of producing piperidine, the step which comprises bringing pyridine in liquid phase and hydrogen, under super-atmospheric temperature and pressure conditions, into contact with a catalyst comprising essentially nickel which may be present at least partly in oxidized form and an oxidized form of a metal forming a metallic oxide more acidic in character than nickel oxide.

6. The process of claim 1 in which the catalyst is substantially alkali-free.

7. The process of claim 1 in which the pyridine body is an alkyl pyridine.

8. The process of claim 1 in which the temperature is within the range of about 175° C. to about 225° C. and the pressure is at least 75 atmospheres.

9. The process of claim 5 in which the temperature is within the range of about 175° C. to about 225° C. and the pressure is at least 75 atmospheres.

10. In a process of producing piperidine, the step which comprises bringing pyridine and hydrogen, at a temperature of about 175° C. to 225° C. and a pressure of about 75 to about 500 atmospheres, into contact with a catalyst prepared by heating a multiple chromate of ammonia and nickel to its spontaneous decomposition temperature, and reducing the resulting composition in a stream of hydrogen at about 500° C. to a form which contains metallic nickel, nickel oxide and nickel chromite.

11. The process of producing piperidine which comprises reacting upon about 175 parts of pyridine with hydrogen at a temperature of about 190° C. to about 220° C. under a hydrogen pressure of about 136 atmospheres in the presence of about 14 parts of a catalyst prepared by dissolving 1750 parts of nickel nitrate in 3000 parts of water, mixing the solution with a solution of 750 parts of ammonium bichromate in an equal volume of water, heating the mixed solution to 90° C. to 100° C. for about 30 minutes with stirring, washing and drying the precipitate, igniting it at 400 C., and then reducing the ignited product for about twelve hours in a stream of dry hydrogen at about 500° C.

WILBUR A. LAZIER.

CERTIFICATE OF CORRECTION.

Patent No. 2,018,680.                                                                October 29, 1935.

WILBUR A. LAZIER.

It is hereby certified that error appears in the heading to the printed specification of the above numbered patent requiring correction as follows: Line 7, strike out the words "In Canada May 11, 1931"; and that the said Letters Patent should be read with this correction therein that the same may conform to the record of the case in the Patent Office.

Signed and sealed this 17th day of December, A. D. 1935.

Leslie Frazer (Seal)                                    Acting Commissioner of Patents.